United States Patent
Nonaka

(10) Patent No.: US 6,765,999 B2
(45) Date of Patent: Jul. 20, 2004

(54) PRIVATE BRANCH EXCHANGE SYSTEM

(75) Inventor: Ryota Nonaka, Onojo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 247 days.

(21) Appl. No.: 10/034,363

(22) Filed: Jan. 3, 2002

(65) Prior Publication Data

US 2002/0094068 A1 Jul. 18, 2002

(30) Foreign Application Priority Data

Jan. 12, 2001 (JP) .................................. 2001-004687

(51) Int. Cl.$^7$ ............................................ H04M 1/64
(52) U.S. Cl. .................................. 379/88.22; 379/88.2
(58) Field of Search .......................... 379/67.1, 88.19, 379/88.2, 88.21, 88.22, 88.23, 142.01, 156, 157, 164, 201.01, 207.14, 207.15, 214.01, 88.05, 88.06

(56) References Cited

U.S. PATENT DOCUMENTS

| | | | | |
|---|---|---|---|---|
| 4,879,743 A | * | 11/1989 | Burke et al. ........... | 379/142.13 |
| 5,276,731 A | * | 1/1994 | Arbel et al. ........... | 379/211.02 |
| 5,402,472 A | * | 3/1995 | MeLampy et al. ....... | 379/88.19 |
| 5,410,539 A | * | 4/1995 | Ikeno ......................... | 370/385 |
| 5,473,672 A | * | 12/1995 | Khalid ..................... | 379/88.22 |
| 5,579,383 A | * | 11/1996 | Bales et al. ............ | 379/211.02 |
| 5,729,600 A | * | 3/1998 | Blaha et al. ........... | 379/266.07 |
| 6,058,180 A | * | 5/2000 | Young ........................ | 379/234 |

* cited by examiner

*Primary Examiner*—Scott L. Weaver
(74) *Attorney, Agent, or Firm*—Stevens, Davis, Miller & Mosher, LLP

(57) ABSTRACT

A private branch exchange has a terminating classification table for storing, in connection with terminating information transmitted through an outside line circuit, destining extension numbers and additional parameters by relating them to each other and a control unit for controlling the above components. When a call terminates at the outside line circuit, the control unit picks up a destining extension number corresponding to terminating information from the terminating classification table, delivers a terminating signal from a corresponding extension line circuit and also delivers a corresponding additional parameter in the form of an additional parameter signal from the inside line circuit.

19 Claims, 5 Drawing Sheets

| DTMF SIGNAL | ADDITIONAL PARAMETER | RESPONSE MESSAGE |
|---|---|---|
| DTMF 1 SIGNAL | 12 | THIS IS A SALES DEPARTMENT. |
| DTMF 2 SIGNAL | 3 | THIS IS AN ENGINEERING DEPARTMENT. |
| — | — | THIS IS XYZ COMPANY. PLEASE ALLOW US TO GUIDE OUR COMPANY. |

FIG.2

| NO. | DESTINING TELEPHONE NUMBER (DIAL-IN TELEPHONE NUMBER) | DESTINING EXTENSION | ADDITIONAL PARAMETER |
|---|---|---|---|
| 1 | 999-1234 | EXT165 | 12 |
| 2 | 999-1235 | EXT166 | 3 |
| 3 | 999-1236 | EXT101 | |

FIG.3

| DTMF SIGNAL | ADDITIONAL PARAMETER | RESPONSE MESSAGE |
|---|---|---|
| DTMF 1 SIGNAL | 12 | THIS IS A SALES DEPARTMENT. |
| DTMF 2 SIGNAL | 3 | THIS IS AN ENGINEERING DEPARTMENT. |
| — | — | THIS IS XYZ COMPANY. PLEASE ALLOW US TO GUIDE OUR COMPANY. |

FIG.4

| | 1209 HZ | 1336 HZ | 1477 HZ | 1633 HZ |
|---|---|---|---|---|
| 697 HZ | 1 | 2 | 3 | A |
| 770 HZ | 4 | 5 | 6 | B |
| 852 HZ | 7 | 8 | 9 | C |
| 941 HZ | * | 0 | # | D |

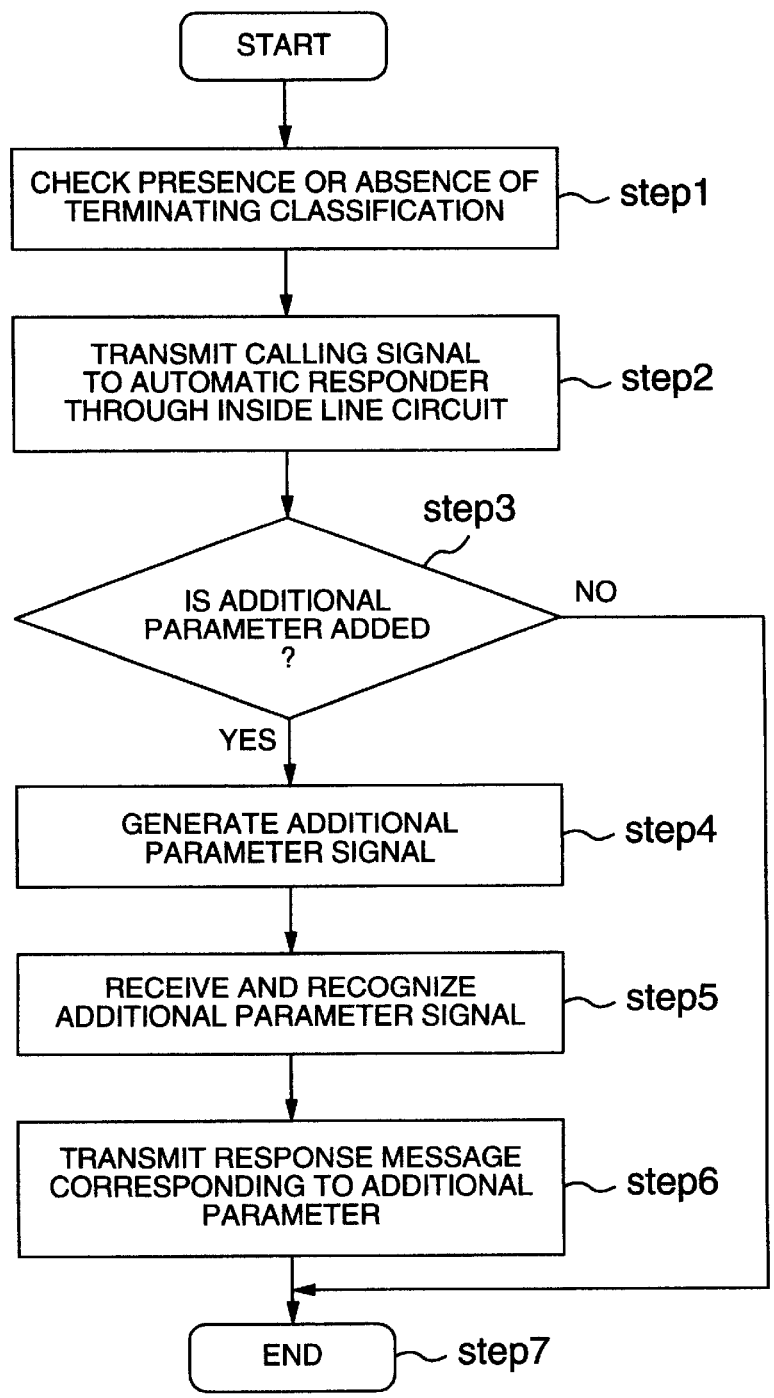

FIG.6

| ORIGINATOR/ DESTINING NUMBER | DESTINATION | ADDITIONAL PARAMETER | | |
| --- | --- | --- | --- | --- |
| | | COUNTRY NUMBER 1 | COUNTRY NUMBER 2 | WITHOUT SETTING |
| OUTSIDE LINE TRUNK CO1 | EXTENSION 101 | 4 | 7 | 2 |
| OUTSIDE LINE TRUNK CO2 | EXTENSION 102 | 5 | 8 | 2 |
| OUTSIDE LINE TRUNK CO3 | EXTENSION 103 | 6 | 9 | 2 |

FIG.7

| ORIGINATOR/ DESTINING NUMBER | DESTINATION | ADDITIONAL PARAMETER | | |
| --- | --- | --- | --- | --- |
| | | ORIGINATOR NUMBER 1 | ORIGINATOR NUMBER 2 | WITHOUT SETTING |
| OUTSIDE LINE TRUNK CO1 | EXTENSION 101 | 4 | 7 | 2 |
| OUTSIDE LINE TRUNK CO2 | EXTENSION 102 | 5 | 8 | 2 |
| OUTSIDE LINE TRUNK CO3 | EXTENSION 103 | 6 | 9 | 2 |

FIG.8

| ORIGINATOR/ DESTINING NUMBER | DESTINATION | ADDITIONAL PARAMETER | | |
| --- | --- | --- | --- | --- |
| | | COUNTRY NUMBER 1 | | WITHOUT SETTING |
| | | ORIGINATOR NUMBER 1 | ORIGINATOR NUMBER 2 | |
| OUTSIDE LINE TRUNK CO1 | EXTENSION 101 | 4 | 7 | 2 |
| OUTSIDE LINE TRUNK CO2 | EXTENSION 102 | 5 | 8 | 2 |
| OUTSIDE LINE TRUNK CO3 | EXTENSION 103 | 6 | 9 | 2 |

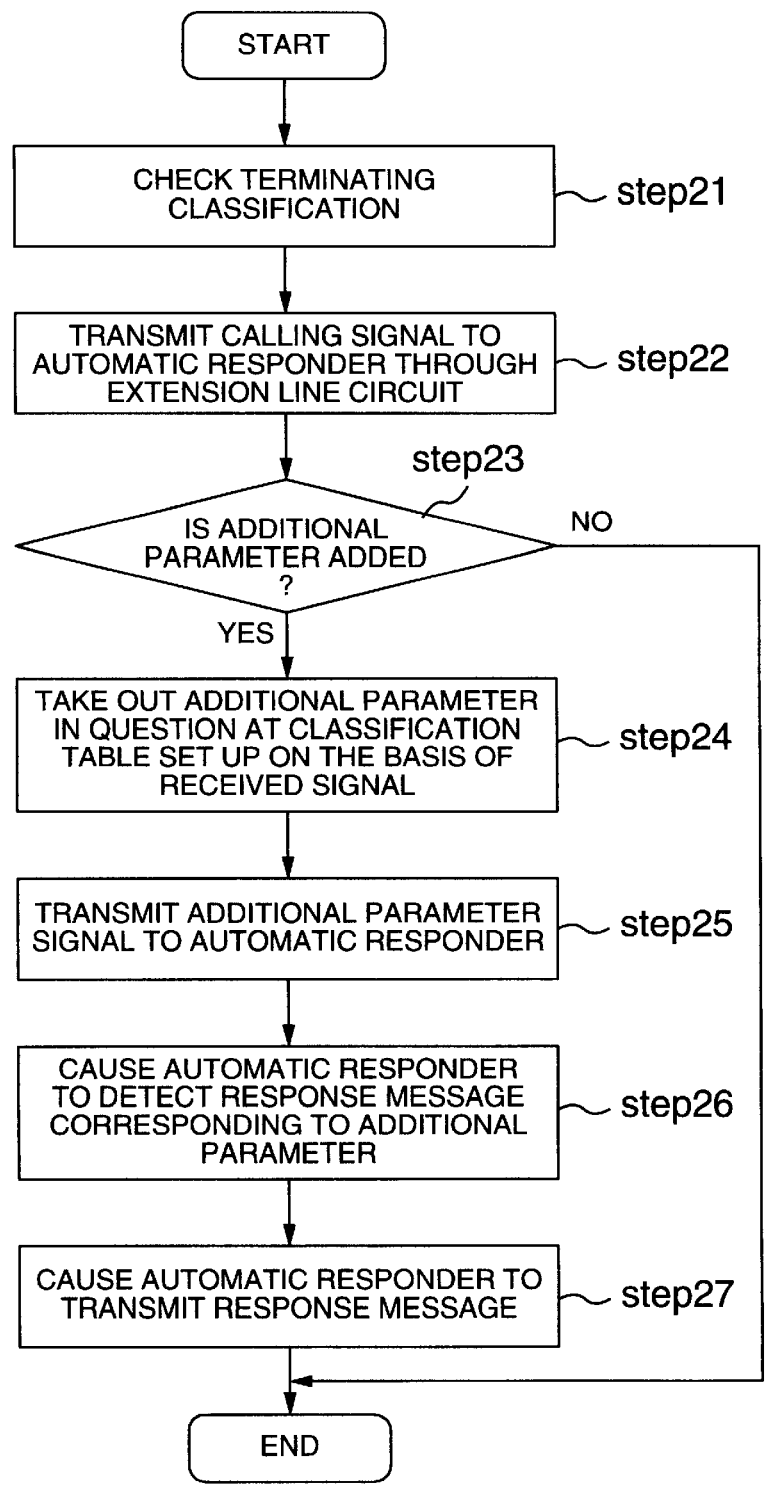

PRIVATE BRANCH EXCHANGE SYSTEM

BACKGROUND OF THE INVENTION

1. Field of the Invention

The present invention relates to a private branch exchange and a private branch exchange system that permit a suitable response to a call from an outside line or the like.

2. Description of the Related Art

Conventionally, when a private branch exchange is used while being connected with an automatic responder such as a voice mail apparatus, a line interface of the automatic responder is connected to an extension line circuit of the private branch exchange so that when a call terminates or arrives at the outside line circuit of the private branch exchange, a terminating signal (incoming signal or calling signal) may be transmitted to an inside line circuit of the private branch exchange assigns as a destination. In other words, in the conventional automatic responder, the terminating signal from the extension line circuit of the private branch exchange is received by the line interface and is responded automatically by using a response message assigned in advance to the line interface.

For example, in order for a sales department, an engineering department and a management department to respond by using separate response messages, methods as below have been available.

Firstly, according to a first method, calls from calling party are all responded with the same response menu and an originator (calling party) selects a desired response menu manually. For example, the call is responded with one response menu purporting "This is XYZ firm. A customer who wants to connect to a sales department is requested to dial No. 1, a customer who wants to connect to an engineering department is requested to dial No. 2 and a customer who wants to connect to a management department is requested to dial No. 3." and an originator operates a desired dial number or push button to select the next response menu.

Since the conventional automatic responder responds to all calls with the same response menu to urge the originator to subsequently select a desired response menu manually, the first method as above cannot be a user-friendly terminating process method.

According to a second method, the extension line circuit, for a call terminating at an outside line circuit of a private branch exchange is destined, is sorted in accordance with a sales department, an engineering department and a management department to make the call terminate or arrive at a separate line interface of an automatic responder.

Since, in the second method, calls are caused to terminate or arrive at separate specified line interfaces of the automatic responder in accordance with terminating information to make the individual specified line interfaces transmit response messages, the specified line interfaces must be provided for individual kinds of terminating information, with the result that the number of extension line circuits and line interfaces of the private branch exchange is increased to raise costs of the private branch exchange and automatic responder.

SUMMARY OF THE INVENTION

An object of the present invention is to provide a user-friendly private branch exchange that does not urge a calling party to perform complicated operations.

An apparatus of the invention comprising: outside line circuits connectable to a plurality of outside lines; extension line circuits connectable with the unit for storage of response messages and extension telephones; a first memory for storing, when an incoming call is received at the outside line circuit, terminating information of the incoming call; a second memory for storing the terminating information and an additional parameter in a state where the information and the parameter are related to each other; signal generating means for generating DTMF signals on the basis of the additional parameter corresponding to the terminating information stored in the first memory; and transmitting means for transmitting the DTMF signals to the unit for storage of voice messages.

BRIEF DESCRIPTION OF THE DRAWINGS

FIG. 2 is a diagram showing a terminating classification table in the first embodiment of private branch exchange of the invention.

FIG. 3 is a diagram showing the correspondence between additional parameter and response menu in the first embodiment of private branch exchange of the invention.

FIG. 4 is a diagram showing the correspondence between DTMF signal and frequency in the first embodiment of the invention.

FIG. 5 is a flowchart of a terminating process in the first embodiment of private branch exchange of the invention.

FIG. 6 is a diagram showing a terminating classification table in a second embodiment of private branch exchange of the invention.

FIG. 7 is a diagram showing another terminating classification table in the second embodiment of private branch exchange of the invention.

FIG. 8 is a diagram showing still another terminating classification table in the second embodiment of private branch exchange of the invention.

FIG. 9 is a flowchart of a terminating process in the second embodiment of private branch exchange of the invention.

DESCRIPTION OF THE EMBODIMENTS

Figure 1:
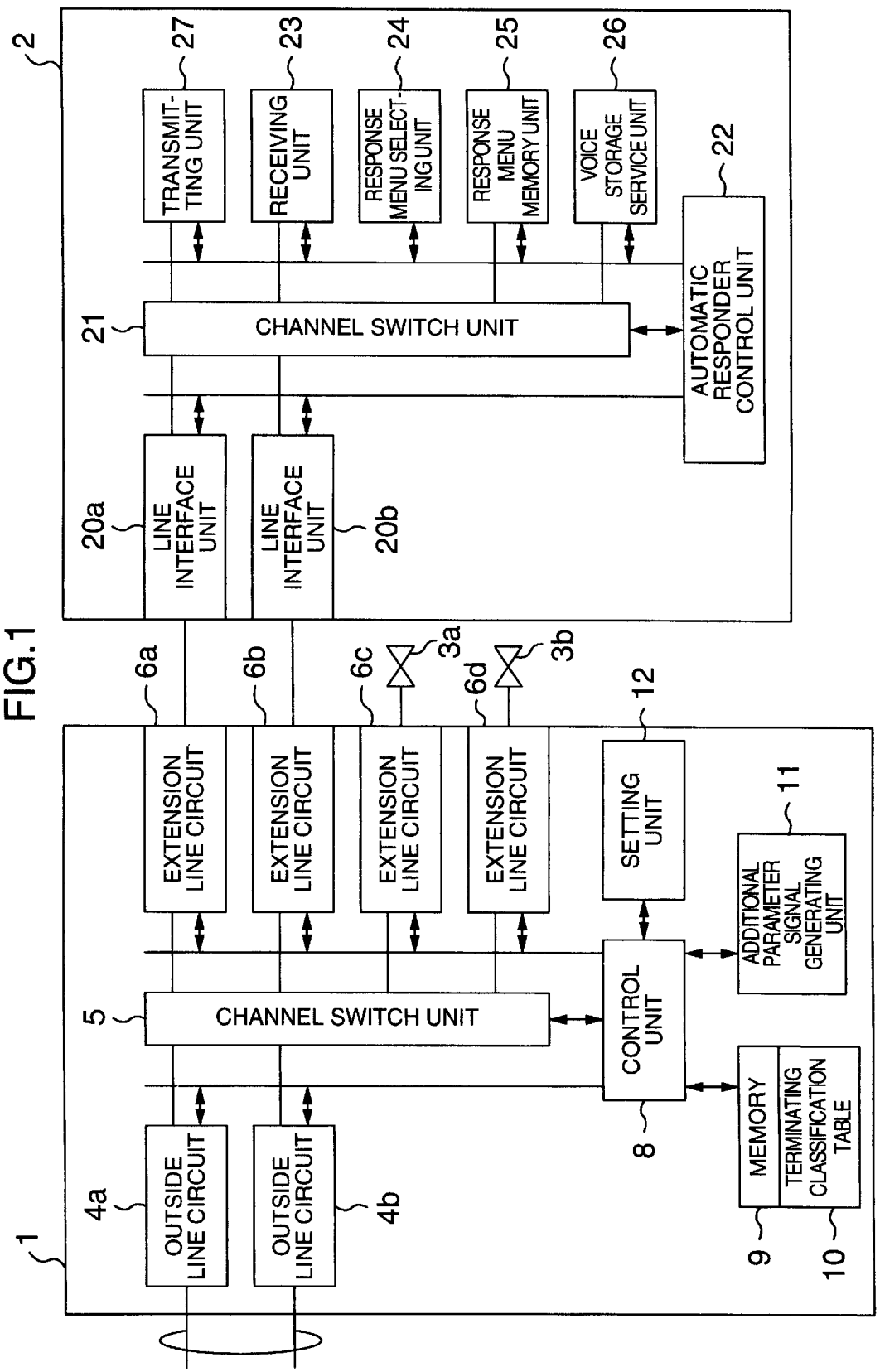
FIG. 1 is a diagram showing the construction of an automatic response exchange system in a first embodiment of private branch exchange of the invention.

The present invention will now be described by way of example with reference to the accompanying drawings.

Construction of Private Branch Exchange

Referring to FIG. 1, an automatic response exchange system in a first embodiment of the invention is constructed as shown therein.

In FIG. 1, a private branch exchange 1 is connectable to either an analog line or a digital line and an automatic responder 2 for voice mail, for instance, is provided externally of the private branch exchange 1. Designated by reference numerals 3a and 3b are extension telephones. The extension telephone 3a is a personal telephone capable of exchanging digital signals through a data line and the extension telephone 3b is a general telephone of analog type.

Outside line circuits 4a and 4b are connected to outside lines of an office line, for instance. The outside line circuit 4a controls connection to a digital line of, for example, ISDN and the outside line circuit 4b controls connection to an analog line of, for example, public telephone network. A channel switch unit 5 is capable of performing switching operation between these lines and the extension telephones 3a and 3b.

Extension port circuits 6a, 6b, 6c and 6d are capable of controlling connection between the automatic responder 2 and the extension telephones 3a and 3b. Specifically, the extension line circuits 6a and 6b are each connected to the automatic responder 2 and the extension line circuits 6c and 6d are connected to the extension telephones 3a and 3b, respectively. The number of the former extension line circuits can be increased. In this case, the extension line circuits can be provided by a number that conforms to the frequency of incoming calls to the automatic responder 2, that is, traffic to the extent of prevention of an excessive call loss.

A control unit 8 controls the channel switch unit 5, outside line circuits 4a and 4b and extension line circuits 6a, 6b, 6c and 6d. A memory 9 stores data necessary for control operation and switching operation.

Reference numeral 10 designates a terminating classification table. In the present embodiment, the classification table 10 is a table that stores at least destining extension numbers and additional parameters to be described later by relating them to originating subscriber (calling party) telephone numbers or destining extension telephone numbers transmitted through the outside line circuits 4a and 4b. An additional parameter signal generating unit 11 can generate a DTMS signal of one digit or plural digits corresponding to additional parameter information stored in the classification table 10. A setting unit 12 performs registration, change and deletion of the destining telephone number and the destining extension number.

The control unit 8 consults the classification table 10 in accordance with the originating subscriber telephone number or the destining extension telephone number transmitted from the outside line during a call termination to read the destining extension number and the additional parameter information corresponding to the destining telephone number and transmits a terminating signal (calling signal) to the extension line circuit 6a or 6b corresponding to the destining extension number. When the automatic responder 2 subsequently responds to the call termination (the calling signal), the control unit 8 causes the additional parameter signal generating unit 11 to generate an additional parameter signal in the form of a DTMF signal so as to transmit it through the extension line circuit 6a or 6b.

Construction of Automatic Responder

Referring again to FIG. 1, internal construction of the automatic responder 2 will be described as follows.

The automatic responder 2 includes line interface units 20a and 20b connected to the extension line circuits 6a and 6b of private branch exchange 1. From the standpoint of system design, the number of line interface units can be increased in accordance with traffic for instance. A channel switch unit 21 performs switching operation of channels between the line interface units 20a and 20b and a voice storage service unit 26 to be described later.

An automatic responder control unit 22 controls individual units of the automatic responder 2 and a receiving unit 23 receives additional parameter signals transmitted from the extension line circuits 6a and 6b of private branch exchange 1 and recognizes additional parameters from the additional parameter signals. On the basis of an additional parameter picked up by the receiving unit 23, a response menu selecting unit 24 selects a corresponding response menu in response menus.

A response menu memory unit 25 stores different response messages in a plurality of storage areas thereof by making the correspondence between the response menus and the additional parameters and the voice storage service unit 26 stores voice data necessary for performing voice service such as response messages and incoming messages of mail box and the like.

A transmitting unit 27 reads a response menu selected by the response menu selecting unit 24 from the response menu memory unit 25 to transmit a response message to the private branch exchange 1. The transmitting unit 27 also transmits a response message or incoming message in mail box stored in the voice storage service unit 26, under the control of the automatic responder control unit 22.

Terminating Classification Table of Private Branch Exchange

The aforementioned terminating classification table 10 and response messages stored in the response menu memory unit 25 will now be described.

Of the terminating classification table in the embodiment of the invention, the terminating classification table is shown in FIG. 2. The correspondence between additional parameters and response menus in the embodiment of the invention is made as shown in FIG. 3 and the correspondence between DTMF signals and frequencies in the embodiment of the invention is made as shown in FIG. 4.

Referring to FIG. 2, the terminating classification table 10 is a destining table having destining telephone numbers as terminating information and includes destining telephone numbers representing dial-in telephone numbers assigned from the office to the private branch exchange 1, destining extensions corresponding to the destining telephone numbers and additional parameters rendered to correspond to the destining telephone numbers and the destining extensions. The destining extension indicates an extension telephone number to which the automatic responder 2 can respond with a prepared menu. The response menu is stored in the response menu memory unit 25. Response menus are rendered to correspond to additional parameters, respectively. The additional parameter is constructed of a combination of DTMF signals of one digit or plural digits formed of numerals in the range of 0 to 9, * and # and alphabetical A, B, C and D is generated by the additional parameter signal generating unit 11.

In addition to the destining telephone number, the terminating information may include a request classification such as originating subscriber number, outside line port number and automatic transfer and a classification such as termination from abroad and therefore, a terminating classification table 10 may also be constructed by setting other terminating information as above in addition to the destining telephone number.

For example, destination No. 1 is assigned with an additional parameter "12". As a signal of this additional parameter, a signal of "697 Hz*1209 Hz" and a subsequent signal of "697 Hz*1336 Hz" are generated as shown in FIG. 4 in the additional parameter signal generating unit 11 and they are transmitted to the receiving unit 23 through the extension line circuit 6a or 6b. These constitute the additional parameter signal to the destination No. 1 (hereinafter referred to as a DTMF 1 signal). The receiving unit 23 recognizes the additional parameter from the DTMF 1 signal, the response menu selecting unit 24 retrieves additional parameter information in the response menu memory unit 25 to read the contents "This is a sales department" corresponding to the additional parameter "12" shown in FIG. 3 and this response message is transmitted from the transmitting unit 27.

Destination No. 2 is assigned with an additional parameter "3" and a signal of "697 Hz*1477 Hz" generated by the parameter signal generating unit 11 to represent this additional parameter information is transmitted to the receiving unit 23 through the extension line circuit 6a or 6b. This is the additional parameter signal to the destination No. 2

(hereinafter referred to as a DTMF 2 signal). The response menu selecting unit 24 reads the contents "This is an engineering department" corresponding to the additional parameter "3" represented by the DTMF 2 signal shown in FIG. 3 and the transmitting unit 27 transmits the read signal.

Since destination No. 3 is not assigned with any additional parameter, it is responded by a response menu for general guidance purporting "This is XYZ company. Please allow us to guide our company".

In such an instance, the additional parameter signal is not transmitted, together with the terminating signal, immediately to the automatic responder 2 but this response menu is once selected to transmit the general message. Thereafter, a separate response based on a DTMF signal from an originator is performed (for example, when a DTMF 1 signal is transmitted, this signal is responded by "This is a sales department" or when a DTMF 2 signal is transmitted, this signal is responded by "This is an engineering department"). This procedure is effective when there is a department unworthy of automatic response.

In other words, the additional parameter is given preferentially to a destination of highly frequent termination to implement the automatic response but for a destination of low frequency, a DTMF signal from the originator is expected to be transmitted through this scheme.

In this case, the additional parameter can be set as follows. More particularly, as a general guidance, a response message to the effect, for example, "This is XYZ company. A customer who wants to connect to a sales department is requested to dial No. 1, a customer who wants to connect to an engineering department is requested to dial No. 2 and a customer who wants to connect to a management department is requested to dial No. 3" is first transmitted. In accordance with a DT signal or a DTMF signal from an originator following this message, a response message of each department ("This is a sales department", "This is an engineering department" or the like) is selected to make a separate response.

Accordingly, such setting of additional parameters that "1" of "No. 1 dial", "2" of "No. 2 dial" and "3" of "No. 3 dial" correspond to additional parameters "1", "2" and "3" is the simplest and the most rational and the terminating classification table 10 can be set in such a way that for terminating information destined for the sales department, "1" is set and for terminating information destined for the engineering department, "2" is set.

With this scheme, when the private branch exchange 1 receives a DTMF signal or a DT signal in some case from an originating subscriber, "1", "2" or "3" is read out of the terminating classification table 10 and the additional parameter generating unit 11 generates a DTMF signal corresponding to "1", "2" or "3" and transmits it to the automatic responder 2. Therefore, automatic response is carried out essentially in accordance with the amount of traffic but a department for which the amount of traffic is small can be dealt with through the general purpose response scheme as above, thereby attaining advantages that the cost can be reduced and the line interface units can be used appropriately and effectively.

Flowchart after Termination

A flowchart of a terminating process when a call terminates or arrives at the automatic response exchange system including the private branch exchange 1 and automatic responder 2 in the embodiment of the invention will now be described.

Referring to FIG. 5 showing the flowchart of a terminating process, when a call is received at an outside line circuit of the private branch exchange 1, the outside line circuit receives the terminating signal and a connection destination number (for example, an extension number), if included, and transmits the information to the control unit.

In step 1, it is determined in the control unit whether terminating information such as a destining number is present or absent and the calling signal is transmitted immediately to the automatic responder 2 through the extension line circuit 6a or 6b (step 2).

In case the presence of the incoming terminating information as above in question is determined in the step 1, the private branch exchange 1 consults the terminating classification table 10 after transmission of the terminating signal to the automatic responder 2 to check whether an additional parameter is assigned (step 3).

With the corresponding additional parameter set (when the control means detects that the corresponding additional parameter is set), the program proceeds to step 4 and the additional parameter signal generating unit 11 transmits a generated additional parameter signal in the form of a DTMF signal to the automatic responder 2 through the extension line circuit 6a or 6b (step 4).

Further, when receiving the parameter signal, the automatic responder 2 automatically responds to the signal to permit termination, so that the receiving unit 23 receives this additional parameter signal and recognizes an additional parameter (step 5). Subsequently, in step 6, a response message corresponding to this additional parameter is selected and the selected response message is read out of the response menu memory 25 and is transmitted from the transmitting unit 27 to the outside line through the private branch exchange 1, thus ending the response process (step 7) under the control of the control unit 8. When any additional parameter is not set in the step 3, a response message indicative of the absence of additional parameter is transmitted.

When, in the present embodiment, the private branch exchange 1 is so constructed as to transmit an additional parameter together with an originating subscriber number to the automatic responder 2 in order to enable the automatic responder 2 to receive the originating subscriber number (such as a CLIP in ISDN line or a Caller ID in analog line), a more friendly response service can be presented easily. For example, by relating a response message to an additional parameter (for example, sales department) and a customer (for example, company A), even for telephone calls from the same originating subscriber number, response messages can be sorted department by department to facilitate management of the response messages. In the case of automatic transfer, for example, information such as transfer destination set from an originating subscriber number can be read to ensure further separate response.

The aforementioned transmission of an additional parameter from the private branch exchange 1 to the automatic responder 2 is an instance using the analog line where the additional parameter is transmitted in the form of a DTMF signal after the automatic responder 2 has responded to a calling signal. In the case of connection set up with a digital line such as an ISDN line, however, an additional parameter can be transmitted along with a calling signal. In this case, an immediate response can be ensured.

When a general purpose automatic responder of general purpose voice mail for instance is used, the automatic responder 2 responds to a terminating signal from the private branch exchange 1 and thereafter, sets the timing for transmission of an additional parameter. For example, on the assumption that the automatic responder 2 can acknowledge a DTMF signal 300 ms after responding to a terminating signal, compatibility between the private branch exchange 1 and the general-purpose automatic responder can be set up by setting the DTMF signal representing the additional parameter such that it is transmitted 300 ms or more after the automatic responder 2 has responded to the termination.

The present embodiment is not limited to the terminating classification based on the destining telephone number set forth so far but for a terminating or incoming call from abroad, a response message of foreign language can be transmitted which is rendered by an additional parameter to correspond to a language used for response on the basis of telephone number information indicative of an originating country. Response menus differing with request classification as represented by automatic transfer may be prepared and they may be incorporated into the response menu based on the terminating classification as described previously.

Second Embodiment

In a second embodiment, the construction of the apparatus is substantially the same as that in the first embodiment but information to be stored in the terminating classification table 10 differs from that in the first embodiment. The different information will be described below.

In the following embodiment, the terminating call information of the terminating classification table 10 has, as terminating classification, an outside line trunk number, that is, a circuit number of outside line circuit 4a or 4b at which a call terminates or arrives, in place of the aforementioned destining telephone number transmitted from the office exchange to the outside line circuit 4a or 4b of private branch exchange. By using a country number or originating subscriber number included in an originating subscriber telephone number transmitted from the office exchange to the outside line circuit, the classification table can also be constructed.

Classification tables of the present embodiment shown in FIGS. 6 to 8 are formed of outside line trunk and extension as well as a conditional group of "country number" and "originator number" indicated in FIGS. 6 to 8, respectively.

FIG. 6 shows a classification table of "country number" using a country number in a received originating subscriber number, FIG. 7 is a classification table of "originator number" using a number excepting a country number (hereinafter called an "originator number") in a received originating subscriber telephone number and FIG. 8 shows a classification table that relates "country number" and "originator number" included in a received originating subscriber telephone number to each other. In each of the classification tables, additional parameters are stored. More specifically, when in FIG. 6 a call terminates or arrives at outside line trunk CO1 and a telephone number of originator transmitted from the office exchange includes country number 1 as country number, a destining extension is extension 101 and an additional parameter transmitted after the destining extension has responded is "4". In case messages in English are so set as to be transmitted when the voice storage unit is connected to the extension 101 and the additional parameter transmitted from the private branch exchange during termination is "4", transmission of a message in the language (English) corresponding to a country (America) of the originator can be ensured. By using the country number contained in the telephone number of originator, the message can respond in various kinds of languages.

When in FIG. 7 a call terminates or arrives at, for example, outside line trunk CO1 and an originator number in a telephone number of originator transmitted from the office exchange is 123-4567 (corresponding to originator number 2), a destining extension is extension 101 and an additional parameter transmitted after the destining extension has responded is "7".

When in FIG. 8 a call terminates or arrives at, for example, outside line trunk CO2, a country number contained in a telephone number of originator transmitted from the office exchange is country number 1 and an originator number is 2 (123-4567), a destining extension is 102 and an additional parameter transmitted after the destining extension has responded is "8".

Like the example of additional parameters determined by the destining telephone number as shown in FIG. 2, response menus of response messages of the automatic responder corresponding to the individual additional parameters are exemplified similarly to FIG. 3. Generated DTMF signals are shown in FIG. 4 and remain unchanged.

In the present embodiment, the user can change various classification tables per se by means of the setting unit 12. In other words, three kinds of classification tables are provided in the present embodiment and one of them can be selected. Alternatively, in the classification tables shown in FIGS. 6 to 8, an additional parameter can be selected on the basis of the outside line trunk and country number by means of the setting unit by neglecting the destination number.

Further, the aforementioned table may be sorted into ones for daytime and nighttime. The additional parameter can be conditioned differently for a case where a call once terminates or arrives at an extension and is then transferred therefrom to another extension.

During the transfer, the extension telephone once responds to the terminating call and this extension telephone originates a call to an extension circuit connected with the automatic responder. Accordingly, the terminating classification table is not consulted typically but the control unit, other than the extension representing the transfer originator, can be so set as to operate to determine which outside line trunk number of outside line trunk the call to be transferred arrives at and then, to transmit an additional parameter on the basis of the outside line trunk number of the call and an extension number of the transfer destination extension that are normally transferred from the terminating classification table.

In an alternative, instead of the outside line trunk number, an additional parameter can be taken out of the FIG. 2 table on the basis of the destining telephone number of the call to be transferred and the transfer destination extension number and can be transmitted to the transfer destination.

Further, it is possible to selectively select through user selection which one of the terminating classification table based on the destining telephone number as shown in FIG. 2 or the terminating classification tables based on the outside line trunk number as shown in FIGS. 6 to 8.

Operation of the present embodiment will be described along a flowchart of FIG. 9.

When a call terminates or arrives at an outside line circuit of private branch exchange 1 from the office exchange in step 21, the outside line circuit receives the termination or terminating call and transmits its information to the control unit. The control unit determines, from the information transmitted from the call terminated outside line circuit, which outside line circuit the call arrives at and in step 22, picks up a destination corresponding to a call terminated outline trunk number from the terminating classification table 10 and immediately transmits a calling signal from the extension line circuit 6a (or 6b) to the automatic responder 2.

In step 23, after transmitting the terminating signal to the automatic responder 2, the control unit 8 of private branch exchange 1 further consults the terminating classification table 10 to check whether an additional parameter is assigned.

When determining in step 24 that the additional parameter is set up, the control unit 8 takes out the additional parameter in question and in step 25, the taken out additional parameter is formed into an additional parameter signal in the form of a DTMF signal by means of the additional parameter signal generating unit 11 and the signal is transmitted to the automatic responder 2 through the extension line circuit 6a (or 6b).

In step 26, the receiving unit 23 of automatic responder 2 receives this additional parameter signal and recognizes the additional parameter. Subsequently, the response menu selecting unit 24 selects a response message corresponding to this additional parameter and reads it from the response menu memory unit 25. In step 27, the read response message is transmitted from the transmitting unit 27 to the outside line through the private branch exchange 1, thus ending the response process.

In case any additional parameter is not set up in the step 23, a response message in the case of the absence of additional parameter is transmitted.

As described above, the automatic response exchange system comprising the private branch exchange and automatic responder of the both embodiments retrieves additional parameters in accordance with an outside line trunk number and takes out corresponding destining extension number and additional parameter from the terminating classification table to deliver them as an additional parameter signal to an extension line circuit, whereby the automatic responder can be caused by the additional parameter to automatically respond so as to make the originator freed from surplus operation and the line interface unit for response menu need not be provided for each destination, thus reducing the number of line interface units and making the construction simple and inexpensive. This holds true for the case where the automatic responder is of general purpose.

The previously described transmission of the additional parameter from the private branch exchange 1 to the automatic responder 2 is exemplified as using the analog line and the additional parameter is transmitted in the form of a DTMF signal after the automatic responder 2 has responded to a calling signal but in the case where connection is set up with a digital line such as ISDN line, the additional parameter can be transmitted along with the calling signal. In this case, an immediate response can be ensured.

Many modifications and variations of the present invention are possible in the light of the above techniques. It is therefore to be understood that within the scope of the invention, the invention may be practiced otherwise than as specifically described.

What is claimed is:

1. A private branch exchange of the type that is connected with a plurality of extension telephones and is connectable with a unit for storage of response messages capable of receiving a specified signal from said exchange so as to transmit to said exchange a voice message corresponding to said signal, said private branch exchange comprising:

outside line circuits connectable to a plurality of outside lines;

extension line circuits connectable with said unit for storage of response messages and extension telephones;

memory means for storing terminating information of an incoming call and an additional parameter in a state where the terminating information and the additional parameter are related to each other;

signal generating means for generating DTMF signals on the basis of the additional parameter corresponding to the terminating information retrieved from said memory means when the incoming call is received from a first one of said outside line circuits; and transmitting means for transmitting said DTMF signals and a telephone number of a calling party according to the incoming call to said unit for storage of response messages.

2. A private branch exchange according to claim 1, wherein said terminating information is a telephone number of the called party transmitted from an office exchange to the first one of said outside line circuits.

3. A private branch exchange according to claim 1, wherein the additional parameter converted into the DTMF signals is transmitted after said unit for storage of response messages has responded to a calling signal.

4. A private branch exchange according to claim 1, further comprising setting means for setting conditions for said memory means.

5. A private branch exchange of the type that is connected with a plurality of extension telephones and is connectable with a unit for storage of response messages capable of receiving a specified signal from said exchange so as to transmit to said exchange a voice message corresponding to said signal, said private branch exchange comprising:

outside line circuits connectable to a plurality of outside lines;

extension line circuits connectable with said unit for storage of response messages and extension telephones;

memory means for storing terminating information of an incoming call and an additional parameter in a state where the terminating information and the additional parameter are related to each other;

signal generating means for generating DTMF signals on the basis of the additional parameter corresponding to the terminating information retrieved from said memory means when the incoming call is received from a first of said outside line circuits; and transmitting means for transmitting said DTMF signals and a telephone number of a calling party according to the incoming call to said unit for storage of response messages, wherein said terminating information is the telephone number of the calling party.

6. A private branch exchange of the type that is connected with a plurality of extension telephones and is connectable with a unit for storage of response messages capable of receiving a specified signal from said exchange so as to transmit to said exchange a voice message corresponding to said signal, said private branch exchange comprising:

outside line circuits connectable to a plurality of outside lines;

extension line circuits connectable with said unit for storage of response messages and extension telephones;

memory means for storing terminating information of an incoming call and an additional parameter in a state where the terminating information and the additional parameter are related to each other;

signal generating means for generating DTMF signals on the basis of the additional parameter corresponding to the terminating information retrieved from said memory means when the incoming call is received from a first of said outside line circuits; and transmitting means for transmitting said DTMF signals to said unit for storage of response messages, wherein:

the terminating information comprises a trunk number of the first outside line circuit at which a calling signal is received.

7. A private branch exchange according to claim 6, wherein the terminating information further comprises the telephone number of the calling party.

8. A private branch exchange comprising:

outside line circuits connectable with outside lines;

extension line circuits connectable with an automatic responder and extension telephones;

memory means for storing, in connection with terminating information transmitted through a first of said outside line circuits, a terminating classification table including an extension number and an additional parameter in a state where the extension number and the additional parameter are related to each other;

signal generating means for generating DTMF signals on the basis of the additional parameter corresponding to the terminating information retrieved from said memory means when an incoming call is received from said first outside line circuit;

transmitting means for transmitting said DTMF signals and a telephone number of a calling party according to the incoming call to said extension line circuits; and control means for controlling said outside line circuits, extension line circuits and said memory means, wherein:

when a call is received at said first outside line circuit, said control means takes out said extension number corresponding to the terminating information in relation with a calling signal from the terminating classification table, delivers the calling signal through a corresponding one of the extension line circuits and also delivers the additional parameter corresponding to the extension number in the form of an additional parameter signal through said corresponding extension line circuit.

9. A private branch exchange according to claim 8, wherein said terminating information comprises a telephone number of the called party transmitted from an office exchange to said first outside line circuit.

10. A private branch exchange according to claim 8, wherein the additional parameter, together with the incoming signal, is transmitted from said extension line circuit.

11. A private branch exchange according to claim 8, wherein after said automatic responder has responded, the additional parameter signal is transmitted to said corresponding extension line circuit.

12. A private branch exchange according to claim 11 further comprising an additional parameter signal generating means for generating a DTMF signal as the additional parameter signal.

13. A private branch exchange according to claim 9, wherein said terminating information further includes the telephone number of the calling party.

14. A private branch exchange comprising:

outside line circuits connectable with outside lines;

extension line circuits connectable with an automatic responder and extension telephones;

memory means for storing, in connection with terminating information transmitted through a first of said outside line circuits, a terminating classification table including an extension number and an additional parameter in a state where the extension number and the additional parameter are related to each other;

control means for controlling said outside line circuits, extension line circuits and said memory means, wherein:

when a call is received at said first outside line circuit, said control means takes out said extension number corresponding to the terminating information in relation with a calling signal from the terminating classification table, delivers the calling signal through a corresponding one of the extension line circuits and also delivers the additional parameter corresponding to the extension number in the form of an additional parameter signal through said corresponding extension line circuit, and said terminating information comprises a trunk number of said first outside line circuit which has received the incoming call.

15. A private branch exchange according to claim 14, wherein said terminating call information further includes the telephone number of the calling party.

16. A private branch exchange comprising:

outside line circuits connectable with outside lines;

extension line circuits connectable with an automatic responder and extension telephones;

memory means for storing, in connection with terminating information transmitted through a first of said outside line circuits, a terminating classification table including an extension number and an additional parameter in a state where the extension number and the additional parameter are related to each other; and control means for controlling said outside line circuits, extension line circuits and said memory means, wherein:

when a call is received at said first outside line circuit, said control means takes out said extension number corresponding to the terminating information in relation with a calling signal from the terminating classification table, delivers the calling signal through a corresponding one of the extension line circuits and also delivers the additional parameter corresponding to the extension number in the form of an additional parameter signal through said corresponding extension line circuit, and the telephone number of the calling party, together with the additional parameter, is transmitted in the form of a signal from said corresponding extension line circuit.

17. A private branch exchange comprising:

outside line circuits connectable with outside lines;

extension line circuits connectable with an automatic responder and extension telephones;

memory means for storing, in connection with terminating information transmitted through a first of said outside line circuits, a terminating classification table including an extension number and an additional parameter in a state where the extension number and the additional parameter are related to each other; and control means for controlling said outside line circuits, extension line circuits and said memory means, wherein:

when a call is received at said first outside line circuit, said control means takes out said extension number corresponding to the terminating information in relation with a calling signal from the terminating classification table, delivers the calling signal through a corresponding one of the extension line circuits and also delivers the additional parameter corresponding to the extension number in the form of an additional parameter signal through said corresponding extension line circuit, and when the incoming call is received at said first outside line circuit and the call once responded to by a first of said extension telephones is transferred to another of said extension line circuits, the terminating information of the call to be transferred is taken out of said terminating classification table to deliver the calling signal from the corresponding extension line circuit and to also deliver the additional parameter in the form of the additional parameter signal from said corresponding extension line circuit.

18. A private branch exchange comprising:

outside line circuits connectable with outside lines;

extension line circuits connectable with an automatic responder and extension telephones;

memory means for storing, in connection with terminating information transmitted through a first of said outside line circuits, a terminating classification table including an extension number and an additional parameter in a state where the extension number and the additional parameter are related to each other; and control means for controlling said outside line circuits, extension line circuits and said memory means, wherein:

when a call is received at said first outside line circuit, said control means takes out said extension number corresponding to the terminating information in relation with a calling signal from the terminating classification table, delivers the calling signal through a corresponding one of the extension line circuits and also delivers the additional parameter corresponding to the extension number in the form of an additional parameter signal through said corresponding extension line circuit, and the terminating information is an outside trunk number or a connection destination telephone number.

19. A private branch exchange comprising:

outside line circuits connectable with outside lines;

extension line circuits connectable with an automatic responder and extension telephones;

memory means for storing, in connection with terminating information transmitted through a first of said outside line circuits, a terminating classification table including an extension number and an additional parameter in a state where the extension number and the additional parameter are related to each other;

control means for controlling said outside line circuits, extension line circuits and said memory means; and setting means for setting up the terminating classification table, wherein:

when a call is received at said first outside line circuit, said control means takes out said extension number corresponding to the terminating information in relation with a calling signal from the terminating classification table, delivers the calling signal through a corresponding one of the extension line circuits and also delivers the additional parameter corresponding to the extension number in the form of an additional parameter signal through said corresponding extension line circuit.

* * * * *